J. MULLER.
COOKING UTENSIL.
APPLICATION FILED APR. 3, 1914.

1,162,641.

Patented Nov. 30, 1915.

Witnesses
C. James Cronin
H. E. Laughlin

Inventor
Joseph Muller
By Victor J. Evans
Attorney

UNITED STATES PATENT OFFICE.

JOSEPH MULLER, OF NEW YORK, N. Y.

COOKING UTENSIL.

1,162,641.  Specification of Letters Patent.  Patented Nov. 30, 1915.

Application filed April 3, 1914. Serial No. 829,344.

*To all whom it may concern:*

Be it known that I, JOSEPH MULLER, a subject of Austria-Hungary, residing at New York, in the county of New York and State of New York, have invented new and useful Improvements in Cooking Utensils, of which the following is a specification.

The general object of this invention is the provision of a cooking utensil, whereby the same may be employed for cooking foods in various manners such as by boiling, steaming and the like.

Another object is to facilitate the operation of cooking various foods and to reduce to a maximum the labor attendant upon cooking the same. And to these ends the invention consists of a receptacle, having an internal annular rib, a detachable meshed wire container suspendedly positioned on the rib within the receptacle and an agitator positioned within the receptacle and adapted to be actuated for stirring the contents thereof.

Other objects will appear and be better understood from that embodiment of my invention of which the following is a specification, reference being had to the accompanying drawings formed part hereof, in which—

Figure 2:
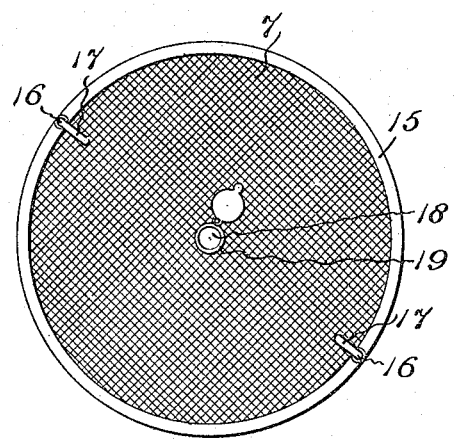
Figure 3:
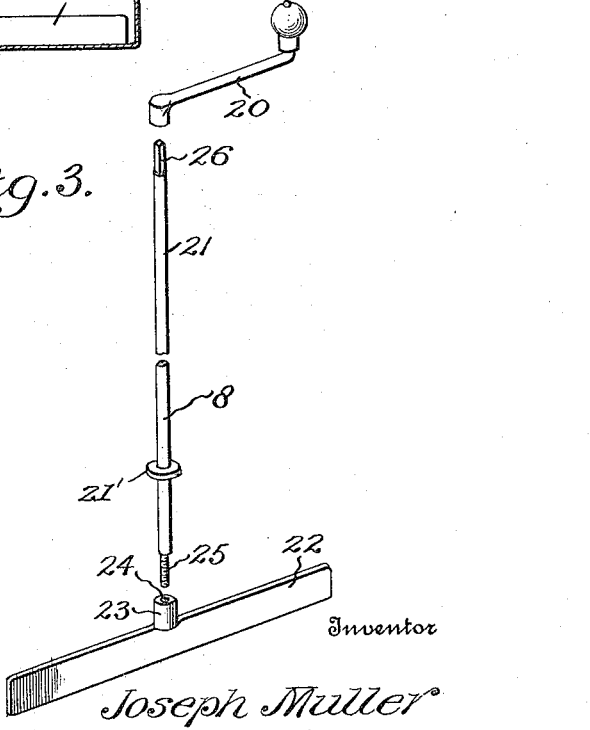

Figure I, is a vertical sectional view of the invention, Fig. 2, is a detail top plan view of the container and, Fig. 3, is a detail perspective view of the agitator, showing the parts separated, for the sake of cleanness.

As shown in the drawings, the invention comprises the receptacle 5 and its cover 6, the container 7 which is detachably positioned within the receptacle and the agitator 8.

The receptacle 5, is preferably cylindrical in shape, and may be made of any suitable material such as tin or enameled metal. The upper edge of the receptacle is bent over so as to provide the usual bend 9; and an annular rib 10 is formed on the periphery of the receptacle and in spaced relation with the bottom of the latter. This annular rib is disposed inwardly, as shown, and operates as a supporting ledge for the container 7, when the latter is positioned within the receptacle. The cover 6 may be formed of a single piece of metal and is preferably of the same material as the receptacle. The cover is provided with an annular flange 11, and a depending portion 12, which fits snugly within the receptacle and admits of the flange resting on the beaded edge 9. The cover is further provided with suitable handles or knobs 13, and is also centrally pierced, as at 14, so as to permit the projection there through of the shank of the agitator, as shown.

The container 7, is cylindrical in shape so as to conform to the shape of the receptacle, and is preferably of a smaller diameter than the interior of the receptacle for the purpose of permitting it to be readily inserted and withdrawn from the receptacle when desired. The container is preferably formed of suitable meshed wire screening and may be of any depth desired, and as shown it is provided at its upper edge with an annular ring 15, for the purpose of engaging with the rib 10 of the receptacle, so that it may be suspendedly held within the receptacle at a distance from the bottom thereof. Mounted on the rim of the container and arranged at diametrically opposite points thereon, is a pair of uprights 16, whose upper ends terminate in downwardly disposed hooks 17, for the purpose of providing suitable handles for the container, whereby the same may be readily positioned or removed at will. In order to permit the passage of the agitator through the container, the bottom of the latter is provided with an opening 18, and to prevent the fraying of the wire structure, a suitable bearing or collar 19 is provided therein as shown.

For the purpose of readily assembling the parts and for facilitating the cleansing of the same, the agitator 8 is provided in three parts, namely, the handle 20, the shaft 21, and the paddle 22. The shaft portion is centrally positioned in the cooking utensil and is loosely fitted in the opening 14 and 18 provided respectively in the cover and the container. The paddle 22 normally rests on the bottom of the receptacle 5, and is of sufficient length to effect the complete stirring of the contents thereof, whereby to prevent the solid ingredients from settling in the bottom of the receptacle and burning thereon, the upper edge of the paddle is provided with a bearing portion 23, which is provided with an interiorly screw threaded bore 24, for the purpose of receiving the reduced lower end portion 25 of the shaft 21 as shown. The upper end 26 of the shank is adapted to project beyond the upper surface of the cover, and is angular in shape so as to be non-rotatably fitted in the handle 20. As shown the handle is angularly disposed to the shaft, and thus operates as a crank, and as will be readily seen, the contents resting on the bottom of the receptacle may be agitated with the paddle by simply rotating the handle 20.

Figure 1:
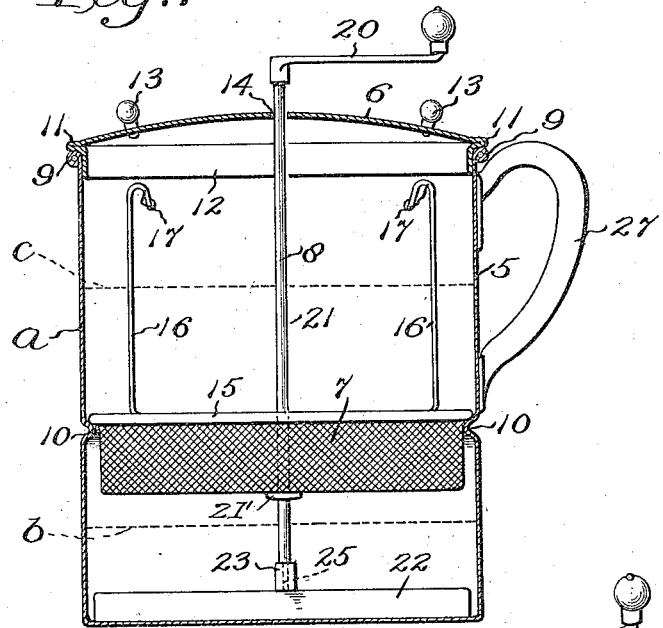

The shaft 21 is provided at a point between its ends with a shoulder 21' upon which the bearing 19 may rest when the parts are assembled as shown in Fig. 1. Therefore the shaft serves as a support for the intermediate portion of the wire structure and its contents. When the parts are assembled the shaft 21' without the handle 20 is inserted through the bearing 19 and the handle 20 is then applied to the upper end of the shaft.

As shown in Fig. I, a suitable handle 27, is provided on the outer side of the utensil A, which thus admits of the same being carried about when desired. The utensil may be used for either steaming or boiling foods, and obviously these manners of cooking are determined by the quantity of water contained in the receptacle 5. When the utensil is employed as a steamer, the food to be cooked is prepared and placed in the wire container 7, and water is placed in the receptacle such as shown by the broken lines $b$. Now it will be seen that as the water boils, the steam arising therefrom will saturate the food and throughly cook the same, whereupon the container may be lifted out of the receptacle by means of the handles 17, and the food removed. In the case of using the utensil for boiling, such as in making soups and the like, the necessary ingredients are placed in the wire container and water is placed in the receptacle such as shown by the broken lines C. Upon the soup being cooked, the wire container may be withdrawn if desired and the remaining contents of the receptacle will be clear broth, thus obviating the necessity of straining the same. It will be understood that where the use of the agitator is not needed, the same may be removed from the utensil.

What I claim as new is;

A cooking utensil comprising a receptacle having an internal rib formed thereon, a ring adapted to rest upon said rib, spaced handles fixed to the ring and lying against the inner surface of the receptacle, a flexible wire screen container attached to the ring and extending down below the lower side of the rib, an inflexible bearing located at the center of the container and an agitator having its shaft journaled in said bearing and provided with a shoulder which engages under the bearing.

In testimony whereof I affix my signature in presence of two witnesses.

JOSEPH MULLER.

Witnesses:
GEO. A. BYRNE,
M. E. LAUGHLIN.